United States Patent [19]
Mark

[11] Patent Number: 4,488,649
[45] Date of Patent: Dec. 18, 1984

[54] RACK FOR PLURAL CYLINDRICAL OBJECTS

[75] Inventor: Kelly J. Mark, Modesto, Calif.

[73] Assignees: Larry D. Watts; Wm. G. Atkins; Mike Harnach, all of Stockton, Calif.

[21] Appl. No.: 315,430

[22] Filed: Oct. 27, 1981

[51] Int. Cl.³ .............................................. A47F 5/01
[52] U.S. Cl. ................... 211/49 S; 206/391; 211/182; 211/189; 410/49
[58] Field of Search ............... 211/49 S, 182, 189, 211/13; 410/49; 108/52.1, 56.1, 55.3, 54.1; 206/443, 446, 593, 516, 391, 393

[56] References Cited

U.S. PATENT DOCUMENTS

| | | | |
|---|---|---|---|
| 1,133,598 | 3/1915 | Winslow | 211/182 X |
| 2,316,560 | 4/1943 | Causey | 211/182 UX |
| 2,662,710 | 12/1953 | Lapham | 108/52.1 |
| 2,803,363 | 8/1957 | Hutchinson | 108/55.3 X |
| 2,873,934 | 2/1959 | Settles | 108/54.1 |
| 3,019,916 | 2/1962 | Malcher | 108/55.3 X |
| 3,476,260 | 11/1969 | Jay | 211/71 X |
| 3,747,780 | 7/1973 | Schneider | 108/55.3 X |

Primary Examiner—Robert W. Gibson, Jr.
Attorney, Agent, or Firm—Julian Caplan

[57] ABSTRACT

A readily portable and, optionally readily disassembled rack comprises longitudinal members on either side and transverse members between the longitudinal members. The transverse members are spaced apart so that cylindrical objects—e.g., reels for wire and cable, rolls of paper, coils of steel, drums, etc.—rest on two adjacent transverse members. The longitudinal members are preferably formed of vertically spaced apart tubing. This permits the rack and contents to be handled by a forklift. It also permits the rack to be supported by the reels on another rack.

4 Claims, 6 Drawing Figures

RACK FOR PLURAL CYLINDRICAL OBJECTS

This invention relates to a new and improved rack for plural cylindrical objects such as wire and cable reels, large rolls of paper, coils of steel strip, drums and barrels and the like, all termed "reels" in the following description and claims for convenience. Each rack holds several reels and, furthermore, accommodates reels of different diameters and heights. The reels are cradled between the longitudinal members of each rack and are supported by the transverse members in such manner that the reels are held immobile.

One of the principal features of the invention is the fact that considerable saving in space for warehousing and transporting in trucks is achieved. Several racks and their contents may be stacked on top of each other within practical limits.

A feature of the invention is the fact that the racks and the reels installed thereon are easily handled and transported. Thus, a rack containing plural reels may be lifted by means of a forklift and one rack and its contents stacked on top of the other, either in a warehouse or on the bed of a truck.

Another feature of the invention is that individual reels may be moved from the top layer of a stack of racks.

Another feature of the invention is the safety achieved by the construction hereinafter described. The stack of racks is extremely stable. Adding and subtracting layers of reels or individual reels from the top layer is readily achieved.

In certain modifications of the invention hereinafter described, the racks are disassembled for shipment or storage. In one of the modifications, the spacing between transverse members may be varied by the ultimate users selecting tubing of desired size to achieve the spacing between transverse members desired, depending upon the size reels that particular user desires to store.

There have been prior racks used for storing reels and particularly for metal drums. Such racks have longitudinal members on either side joined by transverse members. However, such prior racks have upward extending members which function as cradles for the reels. These constructions have a number of undesirable features which are overcome in the present invention. The cradle forming members are in addition to the transverse members thereby increasing the weight and complexity of the structures. These cradle forming members also make the racks difficult to stack when empty. Additionally, in these prior art structures, the reels rest on the longitudinal members and are thus located higher above the racks than in accordance with the present invention. Where the racks are stacked one on top of each other, the over-all height of the stack is greater in accordance with these prior structures than with the present invention. The present invention also increases stability and safety.

Other objects of the present invention will become apparent upon reading the following specification and referring to the accompanying drawings in which similar characters of reference represent corresponding parts in each of the several views.

Figure 1:
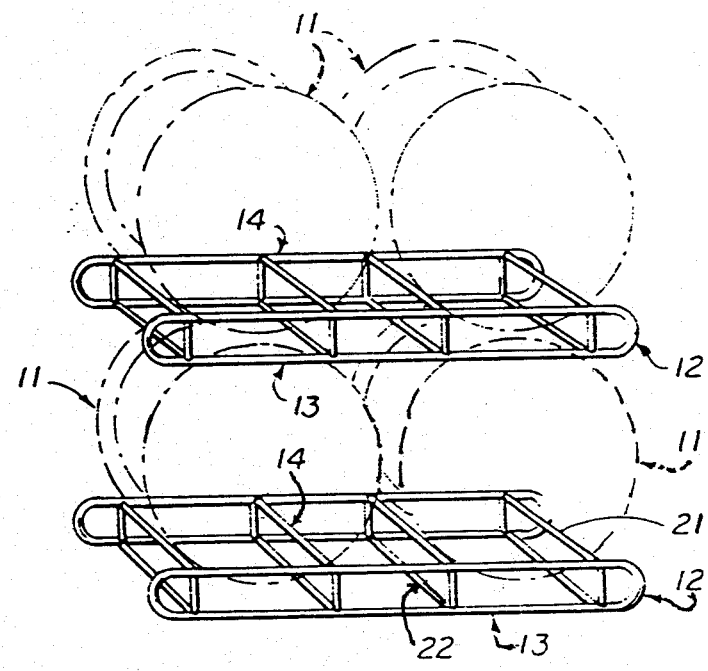
FIG. 1 is a perspective view of two racks, each containing two large reels.
Figure 2:
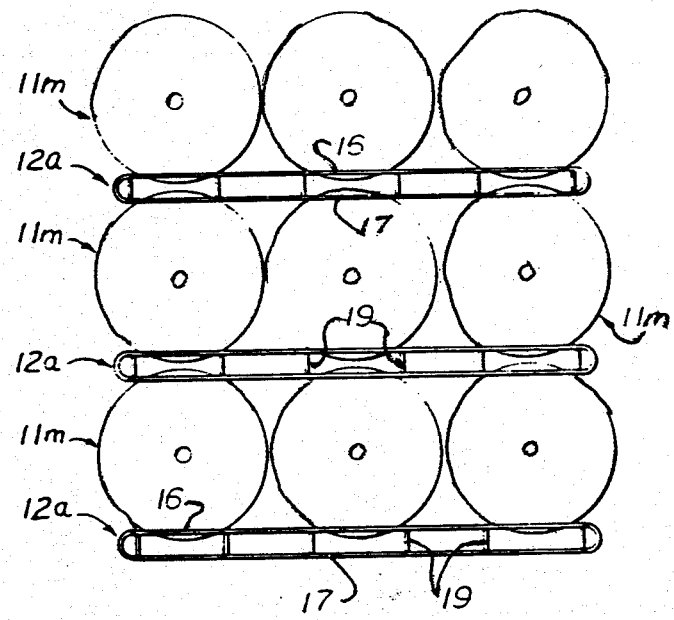
FIG. 2 is a side elevational view showing three racks in accordance with the present invention stacked on top of each other, the top and bottom racks having large reels supported thereby and the middle rack having three smaller reels supported thereby.

FIGS. 1 and 2 show plural reels 11 supported by plural racks 12. The reels 11 are of the type used for wire and cable. As has previously been stated, other cylindrical objects such as large rolls of paper, coils of steel, or metal drums and barrels may be stored. The reels 11L may be as large as 42" in diameter and 36" in width for racks 12 of an over-all length of approximately 98" and an over-all width of 36". It will be seen that individual reels may be added to or removed from the topmost layer and that the topmost layer of reels may be lifted by lifting the topmost rack 12 by the use of a forklift mechanism of any convenient kind.

Figure 3A:
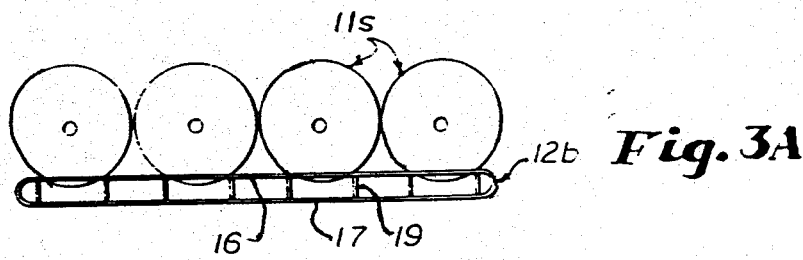
FIG. 3A is a view similar to FIG. 2 showing a rack for four small reels.
Figure 3:
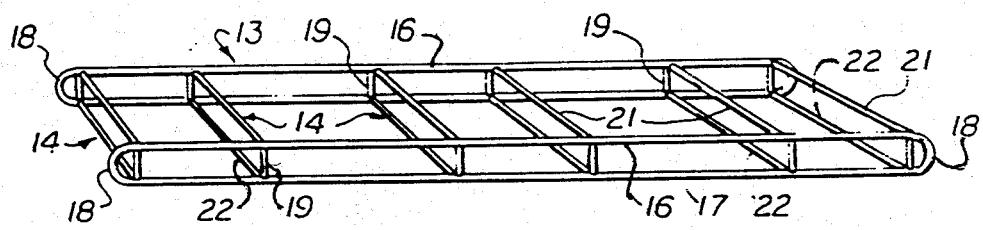
FIG. 3 is a perspective view of the structure of FIG. 1 with no reels installed.

Directing attention now to FIG. 3, the rack 12 consists of a longitudinal member 13 on each side interconnected at intervals by transverse members 14. These members may be welded, bolted or otherwise attached. It will be noted that the spacing between the transverse members 14 is preferably not uniform. Thus proceeding inward from each end the distance between the endmost transverse member 14 and the next member is preferably about 18 inches and the distance between the latter member and the next innermost member is approximately 22", leaving a distance of approximately 18" between the two innermost members. This spacing is, of course, subject to variation. In at least one of the modifications hereinafter described, the spacing is variable as hereinafter appears.

In FIG. 1, two large reels 11L are supported by a rack 12 have four crossbars 21. In FIGS. 2 and 3 three medium reels 11M are supported by racks 12a having six crossbars. In FIG. 3A four small reels 11S are supported by rack 12b having eight crossbars.

Each longitudinal member 13 comprises a top longitudinal rail or tube 16 and a bottom longitudinal rail or tube 17 joined together at each end by a semicircular end piece 18 and spaced apart at various locations by vertical legs or supports 19. The tubing members 16–19 are shown to be round in cross-section. However, pipe or square or retanguler tubing may be used.

Each transverse member 14 or crossbar comprises a top transverse rail or tube 21 and a bottom transverse rail or tube 22. Referring to FIG. 2, left-hand reel 11M is supported by the leftmose transverse member 14 and the next innermost member 14. The bottommost part of such reel is below the level of the top tube 16 and the front and back longitudinal members 13 are in front of and behind the ends of the reel 11M. This arrangement decreases the vertical height of the combination of the rack and reel, as compared with prior art racks where the reels rest on the longitudinal members. It will further be seen that the transverse members 14 perform both the function of spacing the longitudinal member 13 apart and also hold the reels in place. In prior art racks, special cradling members have been fastened to the upper surfaces of the rack. Such cradle forming members are eliminated in accordance with the present invention.

Figure 4:
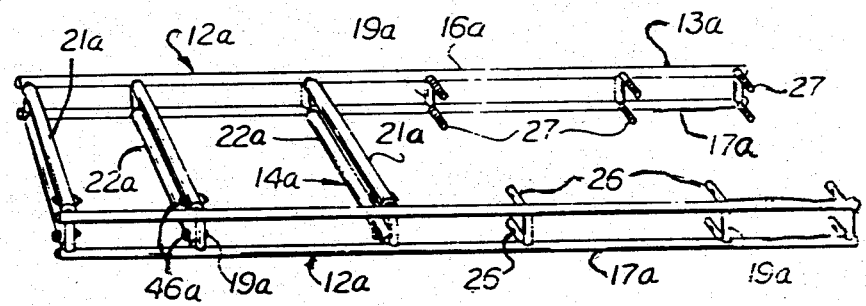
FIG. 4 is a view similar to FIG. 3 of a modification with parts removed to illustrate how the rack is constructed.

Directing attention now to the modification of FIG. 4, the longitudinal members 12a are substantially similar to the longitudinal members 12 of the preceding modification, except that at longitudinally spaced apart intervals on the front member 12a there are studs 26 and on the rear member 12a there are threaded bolts 27. The top transverse member 12a is internally threaded at one end. Thus the unthreaded end of member 21a is slipped over the stud 26 and the threaded end is then threaded onto the bolt 27. The bottom transverse tube 22a is similarly constructed and installed. The structure of FIG. 4a may be shipped disassembled and installed by the end user. The assembly may be disassembled when desired to facilitate shipment to another location or storage. It will further be understood that, although in the preferred form shown in FIG. 4, there is a threaded construction, nevertheless bolts may be used to secure the members 21a and 22a to studs 26 and unthreaded studs 27. End member similar to the members 18 of the preceding modification may be used if desired. The user may install different length tubes 21a, 22a to vary the width of the rack.

Figure 5:
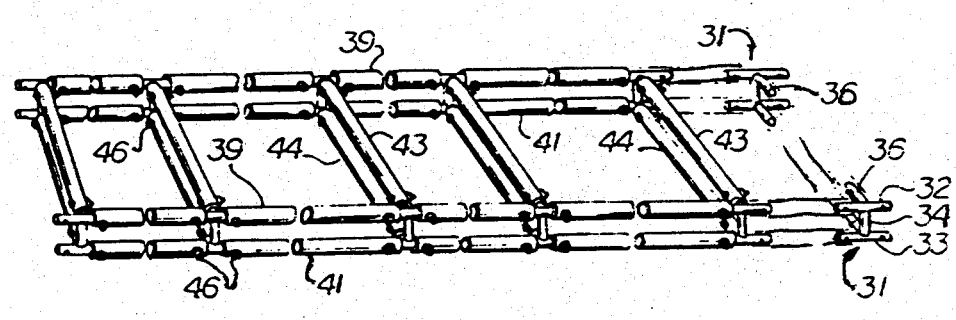
FIG. 5 is a view similar to FIG. 3 of a further modification with parts removed and broken away.

FIG. 5 illustrates a further modification. In this modification there are a plurality of units 31 which are prefabricated preferably by welding tubing. Each unit 31 consists of a horizontal longitudinal top piece 32 and bottom piece 33 interconnected by a vertical piece 34. Projecting inward from the juncture of pieces 34 and 36 are top transverse pieces 36 and similarly projecting inward from the juncture of bottom piece 33 and vertical piece 34 is bottom transverse piece 37. Pieces 36 and 37 join opposed top pieces 36, 37, respectively.

Top and bottom horizontal longitudinal sections 39, 41 respectively are of an outside diameter sufficient to slip through the ends of the top and bottom pieces 32, 33 respectively. They may be held in place by bolts, or may be threaded into position or otherwise secured (e.g., by welding).

What is claimed is:

1. A rack for plural reels, each said reel having a major axis, the major axes of said reels being parallel to each other and horizontally spaced apart a distance at least as great as the diameters of said reels, said rack comprising a single, separate unit movable by a forklift and further comprising a first longitudinal member, a second longitudinal member parallel to said first longitudinal member and a plurality of transverse members interconnecting said longitudinal members at longitudinally spaced locations, each said longitudinal member comprising a substantially straight, horizontal top longitudinal rail, a substantially straight, horizontal bottom longitudinal rail, and legs spacing said top and bottom longitudinal rails apart and vertically aligned to permit entry of forklift forks, said longitudinal members being of a length at least twice the diameter of said reel, said rack being totally open above said longitudinal members to permit reels to be loaded on said rack from above, said transverse members comprising a top transverse rail and a vertically aligned bottom transverse rail, said transverse rails being connected to said top and bottom longitudinal rails, said transverse members being located aligned vertically with said legs, said top transverse rails being at the same level as said top longitudinal rails and said bottom transverse rails being at the same level as said bottom longitudinal rails.

2. A rack according to claim 1 in which the end of each said longitudinal member comprises a semicircular end piece connected to the top and bottom longitudinal rails.

3. A rack according to claim 1 in which said transverse rails are initially detachable from said longitudinal members, said transverse rails being oftubing, one end of said transverse rails being internally threaded and which further comprises a plurality of studs on one said longitudinal member positioned and dimensioned to fit inside said tubing and a plurality of bolts on another said longitudinal member positioned and dimensioned to thread into said tubing.

4. A rack according to claim 1 which is further comprised of a plurality of units each having top and bottom longitudinal pieces, said legs interconnecting said top and bottom longitudinal pieces and top and bottom transverse members interconnecting opposed longitudinal pieces, and in which said longitudinal members comprise a plurality of longitudinal rail sections attached to said longitudinal pieces, said transverse members and said longitudinal rail sections being detachable from said units.

* * * * *